M. B. ECKARDT.
FISH HOOK.
APPLICATION FILED JUNE 25, 1909.

954,788.

Patented Apr. 12, 1910.

Witnesses
M. W. Blackburn
W. D. Schunken

Max Eckardt, Inventor
By Geo. Urdule
Attorney

UNITED STATES PATENT OFFICE.

MAX B. ECKARDT, OF MILWAUKEE, WISCONSIN.

FISH-HOOK.

954,788.	Specification of Letters Patent.	Patented Apr. 12, 1910.

Application filed June 25, 1909. Serial No. 504,233.

*To all whom it may concern:*

Be it known that I, MAX B. ECKARDT, of Milwaukee, Wisconsin, have invented a Fish-Hook, of which the following is a specification.

This invention relates to a novel form of fishhook adapted for use in still-fishing with live bait, and more particularly for fishing with minnows as bait.

The angler using minnows for bait in still-fishing is confronted with great difficulty in keeping the minnow alive upon the hook until seized by the fish, and at the same time holding it in the most advantageous position and preventing it from getting away.

The object of this invention is to provide, in combination with the hook, a bait and bait-holding device, which will keep the minnow alive for a long time and at the same time hold it constantly in proper relative position to the hook. I accomplish this object by the construction shown in the accompanying drawings, wherein—

Figure 1:
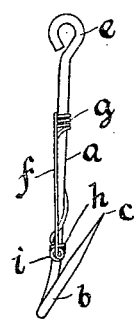
Figure 2:
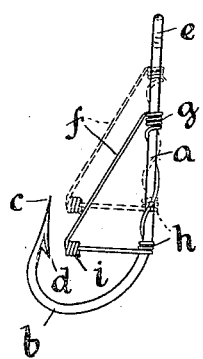
Figures 3, 4:
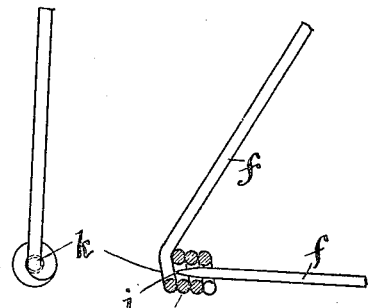

Figure 1 is a front view and Fig. 2 a side view of a fishhook constructed according to my invention; Fig. 3 is a front view and Fig. 4 a side view, partly in longitudinal section, of the free end of the bait-holding device on a larger scale, and Fig. 5 illustrates the hook in use.

The hook itself is of well known and common form, comprising a straight shank $a$, the recurved portion $b$, the point $c$ and the barb $d$; and the upper end of the shank may be provided with an eye $e$ for the attachment of the fish-line. The bait-holding device $f$ consists of a single wire bent triangularly as shown, the intermediate portion thereof being wrapped around the shank $a$ in coils $g$ and $h$, and one end thereof being bent in oblique downward direction and having on its end a coil $i$, and the other end of said wire extending out in a direction at right-angles to the shank $a$ and being pointed as shown at $j$ in Fig. 4; the point $j$ being sheathed within the coil $i$ on the opposite end of the wire $f$. The coil $i$, it will be observed from Fig. 3, is closed at its outer end by the wire which is bent abruptly, as at $k$, so as to cross the end of the barrel of the coil; therefore it is impossible for the point $j$ to protrude from the outer end of the coil.

Figure 5:
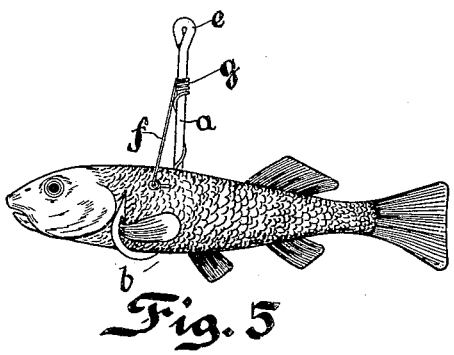

It should be understood, of course, that the oblique end of the wire has a certain resiliency which allows it to be lifted off of the point $j$ in order that the minnow may be impaled thereon, as shown in Fig. 5. When so impaled, the minnow cannot escape, and I have found by experience that it will live for many hours in good condition while so impaled.

To adjust the device to different-sized minnows, the wire $f$ is frictionally slidable upon the shank $a$, and can be moved down until the belly of the fish strikes the recurved portion $b$. It will be observed that the plane of the bait-holding device $f$ is turned at an angle to that of the hook when in use, so as not to cover the point of the hook and shield it from the fish. The friction of the wire $f$ upon the stem is rendered sufficiently great to resist the efforts and movements made by the minnow and to maintain the position in which it is set.

Various changes and modifications in the construction as herein shown may be made without departing from the spirit of my invention, and I wish it understood therefore that the latter is not otherwise limited than by the reasonable scope of my claims.

Having thus described my invention, what I claim as new and desire to secure by Letters Patent is:

1. The combination with a fishhook of a bait-holding device of substantially triangular form longitudinally slidable upon the shank of said hook and having separated bearing points on said shank, said device having an impaling-bar, and means for covering the point of said impaling-bar.

2. The combination with a fishhook of a bait-holding device comprising a wire whose intermediate portion is coiled around the shank of said hook and which has at one end an impaling-bar and at the other end a part provided at the end with a shield adapted to inclose the end of said impaling-bar.

3. The combination with a fishhook of a bait-holding device of substantially triangular form comprising a wire whose intermediate portion is coiled around the shank of said hook and which has at one end an impaling-bar and at the other end a part having a coil turned on the end thereof which is adapted to inclose the point of said impaling-bar; the outer end of said coil passing diametrically across it and forming a closure therefor.

4. The combination of a fishhook having a substantially straight shank, and a bait-holding device comprising a wire whose intermediate portion is coiled around the shank of the hook, one end of said wire extending at right-angles to the shank and forming an impaling-bar and the other end of said wire extending at an oblique angle to the point of said impaling-bar and having a coil of wire turned thereon which is adapted to inclose the point of said impaling-bar.

5. The combination of a fishhook having a shank-portion and a hook-portion at one end of said shank-portion and cord-securing means at the other end of said shank-portion and a bait-holding device of substantially triangular form having a portion parallel with and rotatable upon said shank-portion and having an impaling-bar lying above the bight of said hook-portion.

6. A fishhook comprising a shank-portion, a hook-portion at one end thereof and a cord-securing means at the other end, in conjunction with a bait-holding device comprising an impaling-bar standing outwardly from said shank-portion and adapted to lie approximately in the plane of said hook-portion, whereby said hook-portion is in position to surround and sustain a live bait impaled on said impaling-bar.

7. A fishhook comprising a shank-portion, a recurved hook-portion on one end thereof and a cord-holding device on the other end of said shank-portion; in conjunction with a bait-holding device rotatably and slidably mounted on said shank-portion, said device comprising an impaling-bar standing out at approximately right angles from said shank and adapted to lie within the bight of said hook-portion and in the plane thereof, whereby a bait impaled thereupon is embraced and sustained by said hook-portion and whereby also said hook-portion is kept close to the body of the bait and out of sight of the prey; and means for removably covering the point of said impaling-bar.

In witness whereof I have hereunto set my hand this fifteenth day of June, 1909.

MAX B. ECKARDT.

Witnesses:
LOUIS G. WIDULE,
CARL M. SCHWENDENER.